United States Patent

[11] 3,550,906

| [72] | Inventor | John L. Mayers<br>Juno, Fla. |
|---|---|---|
| [21] | Appl. No. | 814,302 |
| [22] | Filed | Apr. 8, 1969 |
| [45] | Patented | Dec. 29, 1970 |
| [73] | Assignee | United Aircraft Corporation<br>East Hartford, Conn.<br>a corporation of Delaware |

[54] VALVE SEAL
5 Claims, 2 Drawing Figs.

[52] U.S. Cl............................................... 251/306,
251/173
[51] Int. Cl.................................................. F16k 1/22
[50] Field of Search........................................... 251/305,
306, 307, 308, 309, 173

[56] References Cited
UNITED STATES PATENTS

| 1,844,641 | 2/1932 | Wein............................ | 251/173 |
| 2,911,184 | 11/1959 | Moore.......................... | 251/173 |
| 3,077,331 | 2/1963 | Burtis I........................ | 251/173 |
| 3,077,332 | 2/1963 | Burtis II....................... | 251/173 |
| 3,080,145 | 3/1963 | Swain.......................... | 251/306 |
| 3,410,520 | 11/1968 | Mahoney...................... | 251/173 |

Primary Examiner—Clarence R. Gordon
Attorney—Jack N. McCarthy

ABSTRACT: A butterfly valve is mounted in a passageway on an axis which is at an angle of less than 90 degrees to the center line of the passageway. The valve element engages an annular sealing surface which is mounted around the inner periphery of the passageway for sealing the passageway. This sealing surface is connected to an annular valve seat member which is connected to other sealing means which seals between the fixed mating flanges of two sections of the passageway. The invention herein described is made in the course of or under a contract with the Department of the Air Force.

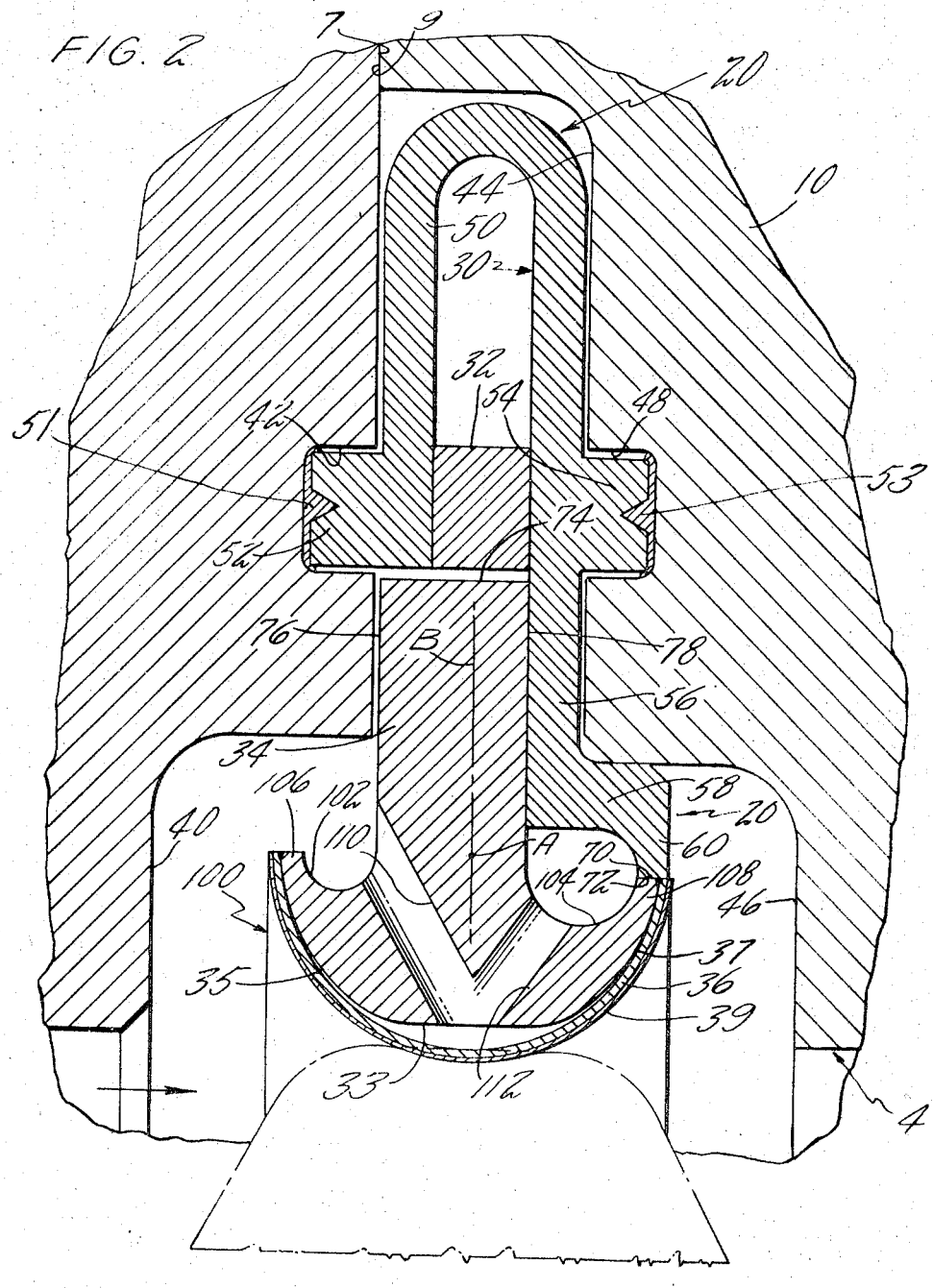

though3,550,906

VALVE SEAL

CROSS-REFERENCE TO RELATED APPLICATION

Application Ser. No. 814,301, filed Apr. 8, 1969, contains the same disclosure.

BACKGROUND OF THE INVENTION

This invention relates to a butterfly valve seal that will reduce leakage to a minimum and provide for easier operation by having the flexible seat connected to the passageway and not to the butterfly valve element.

SUMMARY OF THE INVENTION

The primary objective of this invention is to provide an improved seal construction which will reduce leakage to an acceptable level for fluids which are difficult to seal against.

In accordance with the present invention, an annular resilient seal member is fixed to the passageway and engages a butterfly valve element in its closed position. The resilient member can be coated with a soft material to fill in small imperfections and to present a soft surface for sealing.

Further, the annular resilient seal member is fixed to a spring member which is positioned between the mating flanges of two conduit sections. Guide means are provided to properly position the seal member.

BRIEF DESCRIPTION OF THE DRAWINGS

FIG. 2 is an enlarged view of the sealing means provided to seal the edge of the butterfly valve with the wall of the passageway.

DESCRIPTION OF THE PREFERRED EMBODIMENT

Figure 1:
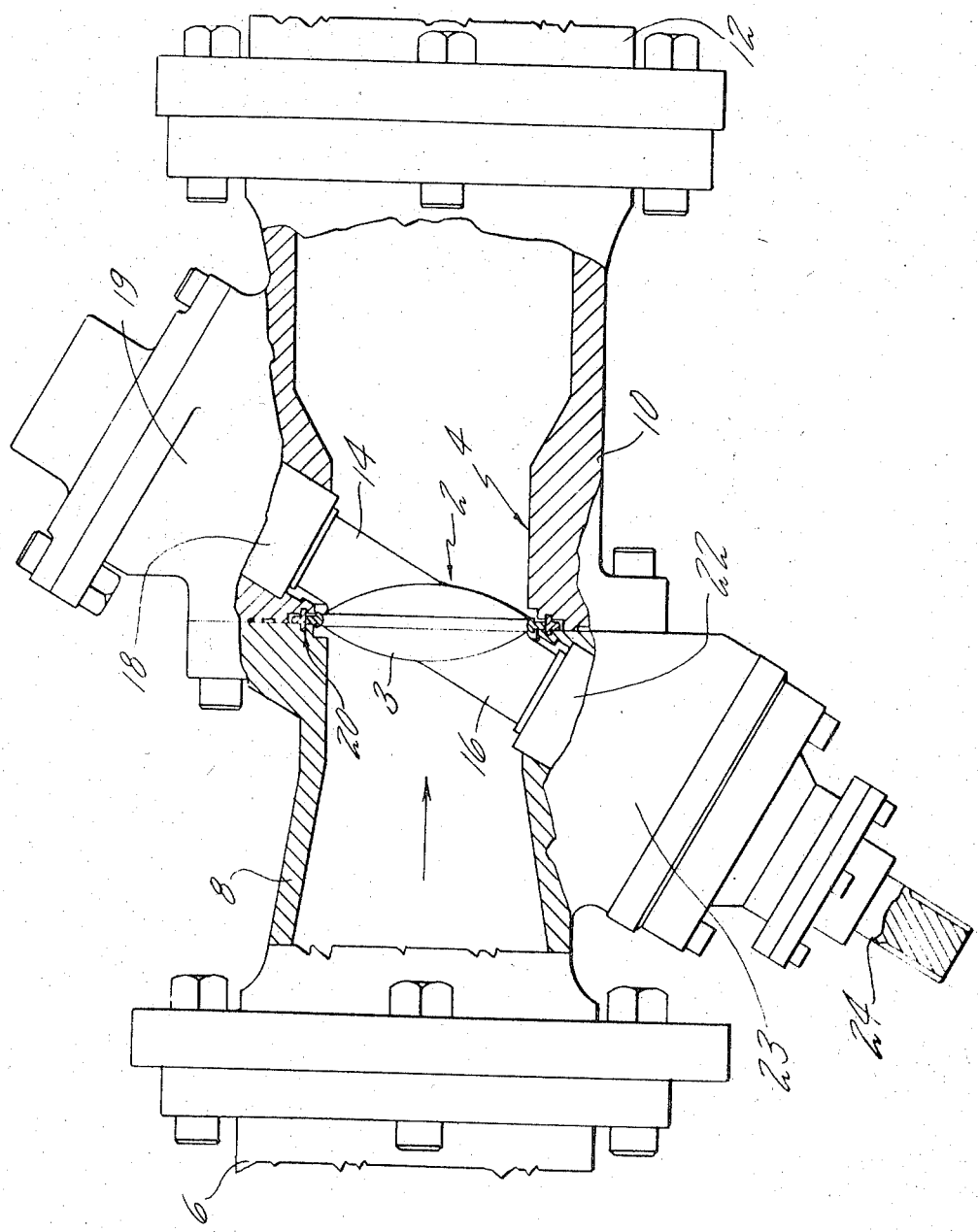
FIG. 1 is a view partially in section showing a butterfly valve mounted in a passageway.

Referring to FIG. 1 a butterfly valve 2 is shown mounted for actuation in a passageway 4. The passageway 4 is formed by a plurality of conduit members 6, 8, 10, and 12. Conduit sections 6 and 8 are fixedly connected by the use of end flanges sealed and bolted together. Conduit section 12 is connected to conduit section 10 in the same manner. At the surfaces where conduit section 8 and 10 meet, an annular sealing means 20 is provided to act as a seal with the outer edge of the butterfly valve 2. These surfaces are also sealed and bolted together.

The butterfly valve 2 has two axially aligned shaft sections 14 and 16 extending from opposite sides of the valve element 3 at an angle of less than 90°. The free ends of the shaft sections are mounted for rotation in bearing units 18 and 22. Housing units 19 and 23 enclose the bearing units 18 and 22, respectively. Power means for rotating the shaft sections can be attached to the splined end 24 which extends from the housing unit 23. When the valve element 3 of the butterfly valve is in its closed position, fully blocking passageway 4, its outer edge is arranged to contact the annular sealing means 20 to prevent leakage at that location.

Sealing means 20 comprises four main elements: (1) a spring biased secondary seal unit 30, (2) a stop means 32, (3) a valve seat member 34 and (4) a flexible valve seat plate 36.

The mating surfaces 7 and 9 of conduit sections 8 and 10, respectively, are formed to receive the sealing means 20. The conduit section 8 has an annular recessed portion 40 opening both into the surface 7 of the conduit section and into the passageway 4. A short distance above the recess 40 another annular recess 42 is formed. The surface 9 of the conduit section 10 has a large annular recess 44 opposite the surface of conduit 8 with a deeper second recess 46 formed adjacent the passageway 4 which is similar to the recess 40. A third recess 48 is formed in the surface of recess 44 which is axially in line with and the same size as the recess 42.

The spring biased secondary annular seal unit 30 is formed at its upper end as a U-shaped member 50 with annular projections 52 and 54 on either side. The U-shaped member 50 has an annular inwardly extending portion 56 extending down from the leg of the U which is adjacent the conduit member 10. The bottom of this member has an axially extending annular flange 58 which extends into the recess 46 and has a slidable engagement therewith to act as a guide for positioning the seal plate 36. An inwardly extending flange 60 extends downwardly to be fixedly connected to the valve seat member 34. In a relaxed position, the legs of the U-shaped member 50 are not parallel but extend at an angle forming substantially a spaced pair of Belleville washers held at their outer edge. In an assembled position annular Teflon washers 51 and 53 are placed in the recesses 42 and 48 squeezed against the bottoms of the recesses by the cooperating flanges 52 and 54 of the seal unit 30. Other materials having similar characteristics can be used. The Teflon washers are equally sized to space the U-shaped member 50 in the center of the recess 44 in its assembled position. Clearance is provided around the seal unit 30 in this position.

A stop means 32 formed as a split ring is positioned in the inner part of the U-shaped member 50 between the end of projections 52 and 54. This ring can be fixed to one side of the U-shaped member. This stop means 32 limits the movement of the free ends of the legs of the U-shaped member 50 towards each other. The sides of the U-shaped member 50 are parallel when in abutting position with the stop means 32.

The valve seat member 34 is formed from two halves as an annular member with an enlarged sealing head 100 around the inner portion. The inner annular surface 33 of said head being flat with sides 35 and 37 that curve outwardly to form surfaces which in any cross section, as shown in FIG. 2, are formed by the same center of curvature A. The center being located on a line B equidistant between the surface 7 of conduit section 8 and the back surface of recess 44 when the member 34 is in its assembled position.

Side 35 extends to a circular line which in any cross section as shown in FIG. 2, is in line with the center of curvature A. Side 37 extends to a circular line at which location a circular face 70 is formed which mates with a cooperating face 72 on the flange 60. Seal unit 30 and seat member 34 are fixed together at this location.

The upper thinner portion of the valve seat member being substantially rectangular in radial cross section with a space being formed between an outer flat edge 74 and the stop means 32 and bottom of the short leg of the U-shaped member 50. A space is also located between the annular side 76 of the valve seat 34 and the surface 7, where they overlap, when the other side 78 is engaging the inner surface of the inwardly extending portion 56.

Material is removed from the sealing head 100 at 102 and 104 to form narrow flanges 106 and 108 for ease in welding or brazing. A plurality of passageways 110 connect the side of the valve seat member adjacent the conduit section 8 with the surface 33. A plurality of passageways 112 connect the other side of the valve seat member to the surface 33.

A flexible annular valve seat plate 36 having an arcuate surface in cross section, as shown in FIG. 2, has a slightly larger radius of curvature than the sides 35 and 37. The plate 36 is fixed, for example by brazing or welding, at its outer annular ends to the annular edges of the sides 35 and 37.

These passageways, or holes, 110 permit the pressure on the high pressure side of the seal to enter the chamber formed between the inner surface of the seat plate 36 and head 100 to provide a self-energizing action. The passageways 112 permit the cleaning of braze flux or weld contamination from the cavity formed between the flange 58, flange 60, and valve seat member 34.

An annular valve seat plate 36 was made from sheet metal as thin as practicable so that the center portions of the sheet metal would deflect independently of its welded edges. Inconel X having a thickness of 0.005 inches was chosen because of its good elongation and high strength. The seat plate 36 was plated to give a soft surface layer 39 and also fill in small surface imperfections on the sheet metal. The plate was silver and its thickness was approximately 0.003 inches.

An attempt was made to keep the thickness in the range of from 0.002—0.004 inches.

I claim:

1. A valve device comprising two conduit sections forming a fluid passageway, an annular sealing means being held between said conduit sections and extending inwardly towards the interior of the passageway, means fixedly holding said sections in position, a butterfly valve element being mounted for movement in said passageway between an open position and a closed position where its outer periphery engages the annular sealing means, said annular sealing means having its outer portion U-shaped in cross section with the open portion facing inwardly, said outer portion being formed as a spring member with the sides being positioned apart in a relaxed position, spacer means being located in the U-shaped area so as to limit the movement of the sides towards each other when the sealing means are mounted and held between the conduit sections.

2. A combination as set forth in claim 1 wherein the sides have an annular axial projection thereon, the annular projection on one side extending toward one conduit section and the annular projection on the other side extending toward the other section.

3. A combination as set forth in claim 2 wherein each conduit section has an annular groove to receive its mating annular projection.

4. A combination as set forth in claim 3 wherein a sealing material is located between the ends of the projections and the bottom of their mating grooves.

5. A combination as set forth in claim 1 wherein one side has an extension which extends inwardly towards said passageway, this extension having an axial projection which mates with a recess in one conduit section to position the sealing means, said sealing means having an inwardly projecting annular head, said head being fixed to the extending portion of the one side.